A. A. EARL.
FLOAT VALVE.
APPLICATION FILED MAR. 18, 1921.

1,432,982.

Patented Oct. 24, 1922.

Inventor.
Arthur Albert Earl
by H. I. S. Dennison Atty.

Patented Oct. 24, 1922.

1,432,982

UNITED STATES PATENT OFFICE.

ARTHUR ALBERT EARL, OF TORONTO, ONTARIO, CANADA.

FLOAT VALVE.

Application filed March 18, 1921. Serial No. 453,210.

*To all whom it may concern:*

Be it known that I, ARTHUR ALBERT EARL, a subject of the King of Great Britain, and resident of the city of Toronto, county of York, Province of Ontario, in the Dominion of Canada, have invented certain new and useful Improvements in Float Valves, described in the following specification and illustrated in the accompanying drawings, that form part of the same.

The principal objects of the invention are to obviate the undesirable noises caused by the slow shutting off of the water supply in the filling of flush tanks through the ordinary type of valve and to devise a construction of valve which will cause the quick filling of the tank and will effect the rapid cut off of the supply when the tank is full.

A further object is to devise a construction which will effectively utilize the direct pressure of the water in maintaining the valve closed.

The principal feature of the invention consists in the novel construction and arrangement of parts, whereby the valve is held open against the water pressure by an arrangement of counter-balancing levers carrying a pressure cup.

Figure 1:
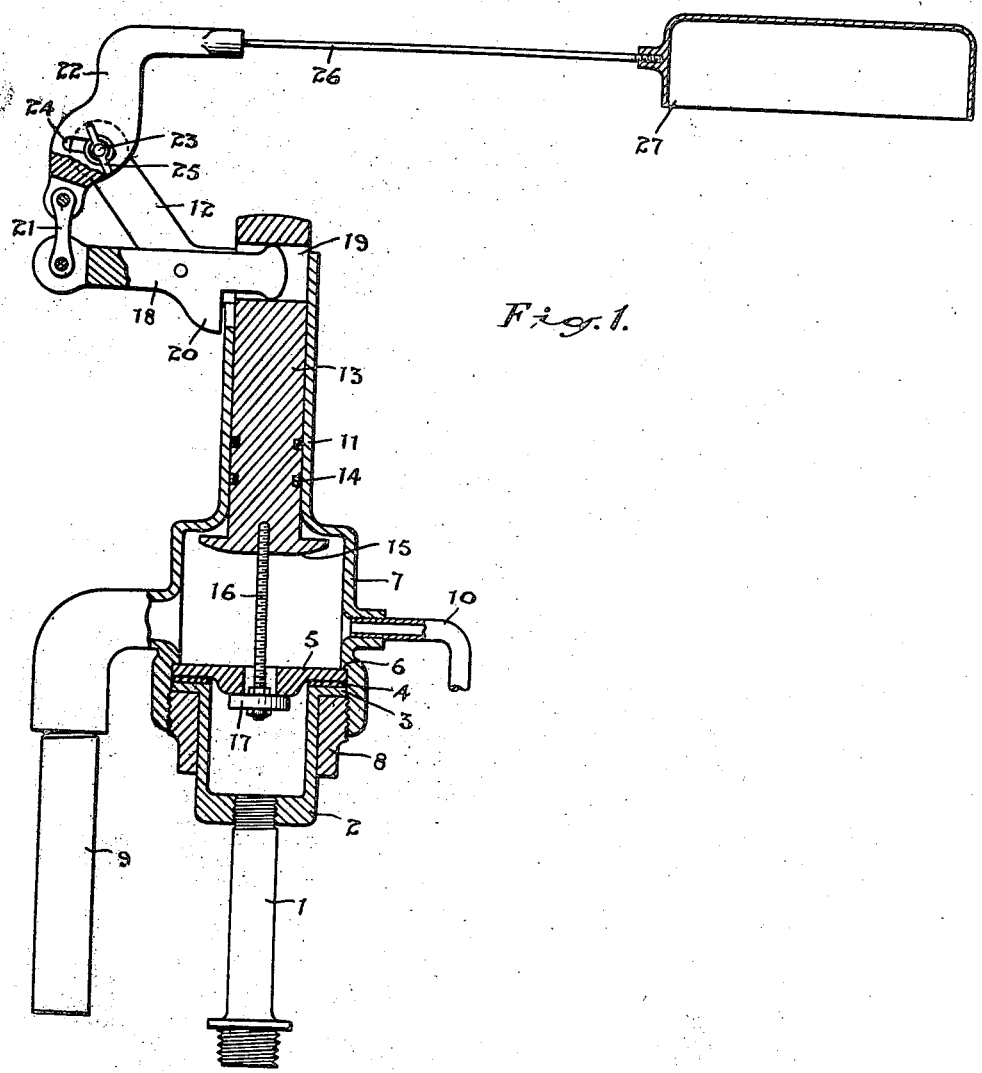

In the drawings Figure 1 is a vertical sectional elevational view of my improved float valve.

Figure 2:
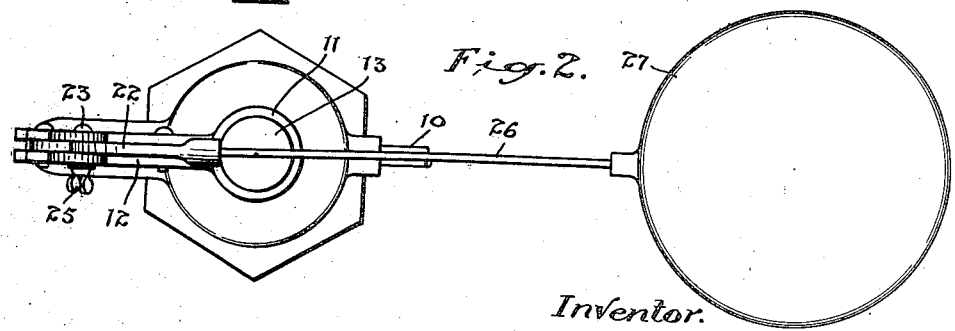

Figure 2 is a plan view.

In the form of the device illustrated herein, a water supply pipe 1 has secured to its upper end the cupped member 2 which is formed with a lateral flange 3 at its upper end and upon which rests a gasket 4. A valve seat 5 rests upon the gasket and is engaged by a shoulder 6 formed within the inner wall of a casing 7. A nut 8 surrounding the member 2 and engaging the underside of the flange 3 secures the casing upon the member 2.

The water entering the chamber within the casing 7 past the valve seat 5 flows through the tank feed pipe 9 leading from one side of the casing 7 and a trap refill 10 is also connected with the side of the casing 7. The upper end of the casing 7 is formed with a cylindrical extension 11 open at the upper end and formed with a slotted arm 12 extending angularly upward from one side thereof. Within the cylindrical extension 11 is arranged a piston 13 which is provided with suitable packing rings 14 to prevent the flowing of water past the piston. The inner end of the piston is preferably formed with a mushroom head 15 to divert the flow of the water from around the piston.

A stem 16 is threaded into the piston 13 and extends through the valve seat 5 supporting a disc valve 17 on its lower end, which valve is adapted to engage the valve seat and to close the inlet opening, the water pressure holding the valve tightly to its seat.

A lever 18 is pivotally arranged in the slotted arm 12 and one end thereof extends inwardly into a transverse slot 19 in the top end of the piston 13. A stop lug 20 limits the downward movement of this lever by engaging the side wall of the cylinder 11. The outer end of the lever 18 is connected by a link 21 to a lever 22 which is pivotally mounted upon a pivot pin 23 extending between the jaws of the slotted arm 12.

The lever 22 is provided with a slot 24 to allow of the adjustment of the pivot pin of the arm 12 and a suitable thumb nut 25 is arranged on the outer end of the pin.

A rod 26 is secured in the upper end of the lever 22 and supports at the outer end an inverted shallow sheet metal cup 27 which is adapted to be engaged by the water in the tank.

In the operation of this device, when the water is released from the tank the weight of the cup 27 swings the lever 22 upon its pivot to operate the lever 18 which pushes downwardly upon the piston 13 and moves the valve 17 from its seat allowing the water to flow inwardly into the chamber in the casing 7 and to the tank. The water continues to flow in at full speed as the cup 27 is not engaged by the inflowing water until it reaches near the high mark.

The rising water engages the underside of the cup imprisoning the air therein and as it continues, the pressure lifts the cup swinging the lever 22 on its pivot and operating the lever 18 with a rapid movement. This action is assisted by the pressure of the water against the underside of the valve and the valve is thus closed very quickly, shutting off the supply without any of the singing noises found in the ordinary types of valve.

A valve such as described will remain in operation for an indefinite period as there is nothing which will readily get out of order or wear through long continued use.

What I claim as my invention is:—

A float valve, comprising, a valve chamber having a seat therein, a valve arranged on the pressure side of said seat, a cylinder connected with said valve chamber, a piston operating in said cylinder and supporting said valve, a rigid arm extending from said cylinder, a lever pivoted on said rigid arm and engaging said piston and extending beyond its pivot, a second lever pivoted at the outer end of said rigid arm, a link pivotally connecting the outer ends of said levers, a rod secured to the free end of the latter lever, and a pressure cup secured to the outer end of said rod.

ARTHUR ALBERT EARL.